United States Patent [19]
Lautenschlager

[11] Patent Number: 5,748,710
[45] Date of Patent: May 5, 1998

[54] METHOD, NETWORK, SYSTEM AND DEVICES FOR CENTRAL MANAGEMENT OF SPOKEN ANNOUNCEMENTS FOR DOWNLOAD ON DEMAND

[75] Inventor: Wolfgang Lautenschlager, Weissach-Flacht, Germany

[73] Assignee: Alcatel N.V., Rijswijk, Netherlands

[21] Appl. No.: 701,082

[22] Filed: Aug. 21, 1996

[30] Foreign Application Priority Data

Sep. 2, 1995 [DE] Germany .................. 195 32 490.0

[51] Int. Cl.$^6$ ...................................................... H04M 3/50
[52] U.S. Cl. ........................... 379/88; 379/207; 379/213
[58] Field of Search ................................. 379/207, 201, 379/88, 67, 89, 84, 213, 214

[56] References Cited

U.S. PATENT DOCUMENTS

| | | | |
|---|---|---|---|
| 4,706,270 | 11/1987 | Astegiano et al. | 379/2 |
| 4,782,509 | 11/1988 | Shepard | 379/88 |
| 4,899,373 | 2/1990 | Lee et al. | 379/207 |
| 5,513,250 | 4/1996 | McAllister | 379/91 |
| 5,519,772 | 5/1996 | Akran et al. | 379/265 |
| 5,553,119 | 9/1996 | McAllister et al. | 379/67 |
| 5,581,601 | 12/1996 | Abramowski et al. | 379/67 |
| 5,594,789 | 1/1997 | Seazholtz et al. | 379/207 |

OTHER PUBLICATIONS

"Implementation of ISDN Wide Area Centrex in System 12", K.P. Lathia, *Electrical Communication*, vol. 63, No. 4, 1989, pp. 374–382.

"Client–server–Paradigma in Intelligenten Netzen", B. Christiansen et al, *Telecom Report*, vol. 18 (1995), No. 4, pp. 202–205.

"Neue Dienste und Anwendungen dank Intelligentem Netz", P. Fregelius, *TEC 2/92 ASCOM*, pp. 16–20.

"A Service Management System for the Intelligent Network", F. Ljungblom, *Ericsson Review No. 1*, 1990, pp. 32–41.

"Voice Services on the Intelligent Network: Intelligent Peripherals and Service Nodes", F. Bosco, *CSELT Technical Reports*, vol. XX, No. 4, Aug. 1, 1992, pp. 347–353.

"General Characteristics of Intelligent Networks", L. Alvarez Mazo et al *Electrical Communication*, vol. 63, No. 4, 1989, pp. 314–320.

*Primary Examiner*—Thomas W. Brown
*Attorney, Agent, or Firm*—Ware, Fressola, Van Der Sluys & Adolphson LLP

[57] ABSTRACT

The invention concerns a method for the providing of messages for subscriber information for services in a communication network, as well as a service control facility (SCP1), a service support system (IP1), a service access arrangement, a service switching point and a service system for the execution of this method. The messages for subscriber information, for instance, voice announcements or speech texts, are managed centrally from the service control facility (SCP1). Only by need are the messages for subscriber information loaded into the service support system (IP1) from the service control facility (SCP1, SCP2). One of the messages loaded into the service support system (IP1) is only sent to a subscriber of the communication network subsequent to a transmitted demand message from the service control facility (SCP1) to the service support system (IP1).

11 Claims, 2 Drawing Sheets

METHOD, NETWORK, SYSTEM AND DEVICES FOR CENTRAL MANAGEMENT OF SPOKEN ANNOUNCEMENTS FOR DOWNLOAD ON DEMAND

TECHNICAL FIELD

The invention concerns a method to make messages available as subscriber information for the service of a communication network, and concerns as well a service control center, a service support system, a service access arrangement, a service switching station and a service system.

BACKGROUND OF THE INVENTION

In increasing measure, the subscribers to a communication network are being offered such utilities as "Service 130" or "Kiosk-Service". The invention proceeds from the recognition of the need for spoken announcements for such unit services as part of today's favored "IN-architecture" (i.e. IN=Intelligent Network).

The realization thereof is described, for instance, in the article "Voice Services on the intelligent network: intelligent peripherals and service nodes" written by F. Bosco and which appeared in the Journal CSELT Technical Reports, Vol. XX, No. 4, August 1992, pp. 347 to 352.

A central service control point is connected with a plurality of service switching points, which always make voice announcements available by means of service support systems. The service logic for the varied services is installed in the service control point. The service switching points are responsible for the recognition of a service demand and for the switching of service connections. In each of the service support systems, collective voice announcements for various services are stored in coded form.

In order to send a voice announcement to a subscriber, the service logic of a service dispatches a demand message to the respective service support system. The voice announcement is then formulated in the service support system and sent to the subscriber by means of a speech/data channel of the communication network. Further, the service support systems are connected over an X.25 interface with a management-system, which serves the administration of the service support systems and by means of which the voice announcement in the stored voice announcements are changed and new announcements can be installed.

In a great number of the offered services in the communication network, problems can arise in this kind of origination of spoken announcements. For one, all of the collected changes in voice announcements along with every new alteration of voice announcements must be formulated by means of the management system in all service support systems. This is extremely expensive. Another problem is that in many voice announcements, a great deal of memory space in the service supports system is absorbed, so that voice announcements for special services can to be installed only in a few service support systems.

DISCLOSURE OF THE INVENTION

The invention, then, has the fundamental purpose to make available messages for subscriber information for the services of a communication network.

According to a first aspect of the present invention, a method of providing messages to subscribers relating to services of a communications network wherein the messages are sent from a service support system to a subscriber of the communications network in response to a request message from a service control point, is characterized in that the messages are managed centrally by the service control point, and that the messages are loaded from the service control point into the service support system on demand.

According to a second aspect of the present invention, a service control point comprising a communications facility for communicating with at least one service access facility containing a service support system, and further comprising at least one service logic which is designed to send request messages to the service support system for sending messages to subscribers relating to services, and is characterized in that the service control point is provided with a load device which is designed to manage the messages centrally and to load said messages into the service support system.

According to a third aspect of the invention, a service support system comprising a communications facility for communicating with at least one service control point, a memory device for storing messages relating to services, and a controller which causes such a message to be sent to a subscriber in response to a request message from the service control point, is characterized in that the service support system is provided with a load device which is designed to store messages relating to services which are received from the service control point in the memory device.

According to a fourth aspect of the present invention, a service access facility comprising one or more service switching points and at least one service support system which is connected to at least one of the service switching points, is characterized in that the service support system is a service support system comprising a communications facility for communicating with at least one service control point, a memory device for storing messages relating to services, and a controller which causes such a message to be sent to a subscriber in response to a request message from the service control point, and in that the service support system is provided with a load device which is designed to store messages relating to services which are received from the service control point in the memory device.

According to a fifth aspect of the present invention, a service switching point is characterized by incorporating a service support system comprising a communications facility for communicating with at least one service control point, a memory device for storing messages relating to services, and a controller which causes such a message to be sent to a subscriber in response to a request message from the service control point, and in that the service support system is provided with a load device which is designed to store messages relating to services which are received from the service control point in the memory device.

According to a sixth aspect of the invention, a service system is characterized by being designed to provide messages relating to services by a method of providing messages to subscribers relating to services of a communications network wherein the messages are sent from a service support system to a subscriber of the communications network in response to a request message from a service control point, in that the messages are managed centrally by the service control point, and in that the messages are loaded from the service control point into the service support system (IP1 to IP3) on demand.

Messages for subscriber information, which are also often called announcements, are in the present case, for example, voice announcements for sending messages in the form of artificially produced language or voiced texts for the issuance of messages in the form of texts shown on a display of an end terminal. Messages for subscriber information, however, can also be all other analog or digital messages, which are sent from a service to a subscriber. Such messages can, for instance, consist of graphics, music or video presentations.

The basic idea of the invention is, to manage messages for subscriber information for services centrally through a service control point and to load said messages only upon need from the service control point in the respective service support system.

The advantage arises in that the messages for subscriber information are centrally stored and thus alterations and new formulations of messages for subscriber information can be undertaken in an especially simple manner. Furthermore, the number of the applicable messages for subscriber information is limited solely by the storage capacity in the service control point. The storage capacity of the service support system can then be reduced and thus on the whole, lesser storage capacity will be necessary.

It is especially advantageous to save the messages for subscriber information directly in the related service logic. Thereby, the messages are subject to immediate possession by the offerer of the current service, and can be changed and formulated anew independently by said offerer for all service support systems centered at the service control center. When a message is loaded to the subscriber information, this will stand available automatically in all service support systems. Especially, this make possible a substantial flexibility where a large number of different service offerers are involved.

These and other objects, features and advantages of the present invention will become more apparent in light of the detailed description of a best mode embodiment thereof, as illustrated in the accompanying drawing.

BEST MODE FOR CARRYING OUT THE INVENTION

In the embodiment example, there is depicted the carrying out of the method in accord with the invention for the provision of messages for subscriber information for services in a service system, which method is comprised of several service control facilities and service access means all in accord with the invention, and which contain a service support system, also in accord with the invention.

Figure 1:
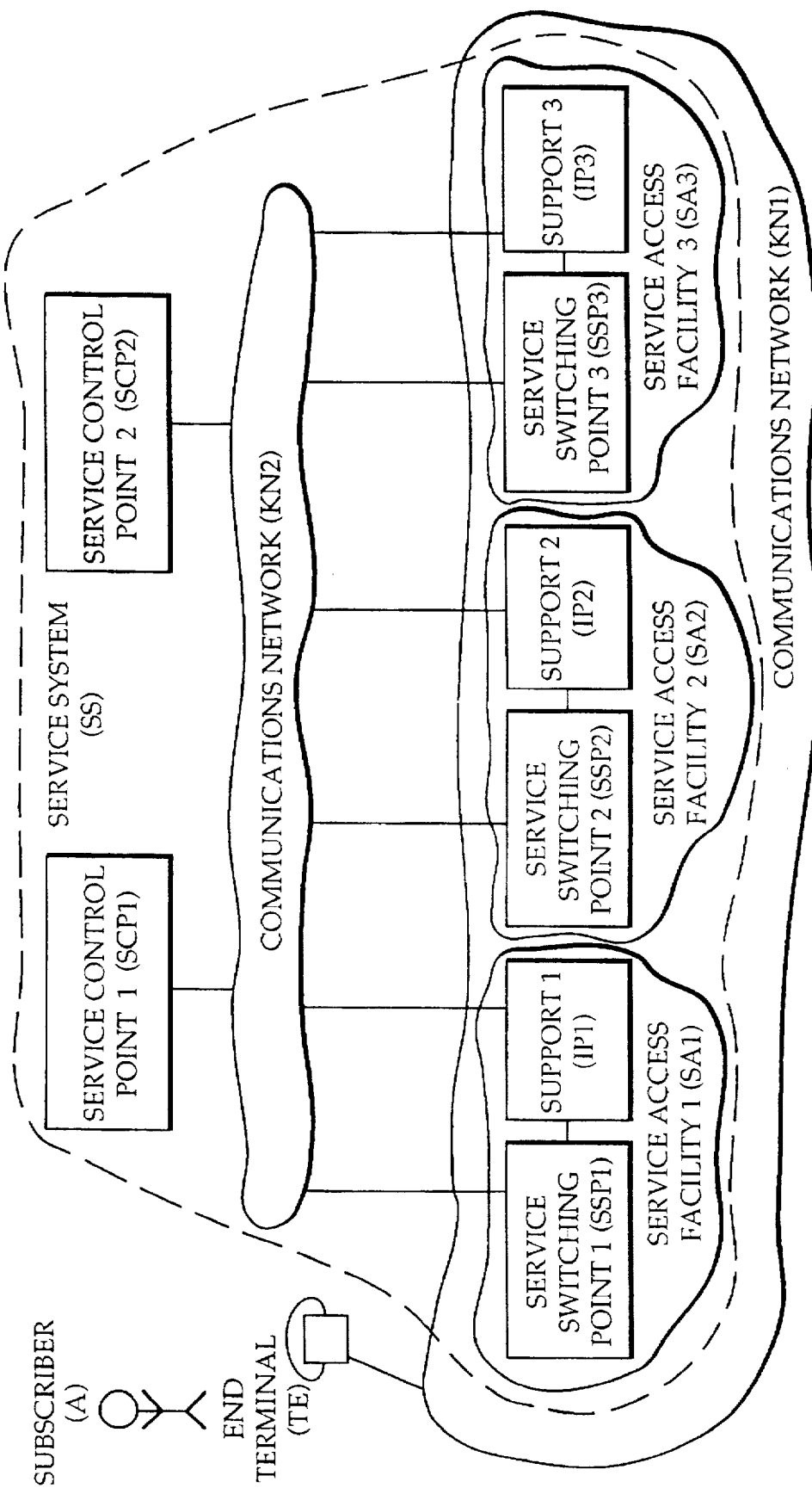
FIG. 1 shows a symbolic presentation of a communication network and a service system in accord with the invention.

FIG. 1 shows two service control points or facilities, SCP1 and SCP2, two communication networks KN1 and KN2, three service switching points, SSP1 to SSP3, three service support systems IP1 to IP3, a subscriber A and a terminal TE.

The service switching points SSP1 to SSP3 are connected with the service support system IP1, IP2 and IP3 and always form together with these a service access facility SA1, SA2 and SA3. The service control facilities SCP1 and SCP2 are connected, by means of the communication network KN2, with the service switching points SSP1 to SSP3 as well as the service support system IP1 to IP3. All these facilities form together a service system SS. The terminal TE is assigned to the subscriber A and is connected with the communication network KN1.

The communication network KN1 is laid out similarly to the conventional TV network and thus contains several switching means. From these switching means the depicted service switching points SSP1 to SSP3, as per FIG. 1, are especially developed. These transmit over communication network KN2, in accord with entered connection options which have specific identifications, demands to the service control facility SCP1 or SCP2 and receive thereupon instructions, which concern further treatment of the desired connection. In the case of such service identification, usually a definite discriminating number is involved, by means of which the subscriber who input the connection option, specifies a desired service. The inquiries are in this case directed from the service switching points SSP1 to SSP3 to those of the service control facilities, SCP1 and SCP2, which function as service control point for the service specified by the discriminating number.

It is also possible that the communication network KN1 be formed of several subnets connected with cross wiring. Such subnetworks can be, for instance, the networks of different network operators, private, public or mobile radio networks.

It is further possible that another number of switching stations of the communication network KN1 are designed similarly to the switching points SSP1 to SSP3. The service support systems IP1 to IP3 are controlled by the service control facilities SCP1 and SCP2. These also serve for the communication with subscribers of the communication network KN1, always by means of a speech/data channel or signalling interface which send to the service switching points SSP1, SSP2 and SSP3. Their task is to support the service control facility SCP1 and SCP2 in the communication with the end terminal equipment of the communication network KN1. These put in place functions for the receipt of messages from subscribers, for instance, touch tone receivers or speech recognition devices, and for the sending of messages to subscribers who are prepared, for instance, for the transmitting of voice announcement or voiced texts. The exact description of the method of functioning such a service support system can be taken from, for instance, the above article "Voice services on the intelligent network: intelligent peripherals and service nodes".

It is also possible that the service support systems be controlled by means of the service switching points from the service control facilities.

The possibilities also exist that the functions of the service support systems are integrated into the service switching points SSP1 to SSP3. This would involve an integrated service support system and a service access facility would arise from a such a service switching position as possesses such an integrated system.

In the case of the communications system KN2, a symbol signaling network according to CCITT Nr. 7 becomes of concern. For the communication network KN2, other preferred data networks can be employed. Especially advantageous when this is done, is to use communication networks based on the principles of an ATM Network (ATM= Asynchronous Transfer Mode), since by means of such a network, large data quantities can be transferred in a short time.

The service control points SCP1 and SCP2 are comprised sometimes from one or more interconnected computers and peripheral components, which especially enable a data communication with the service switching points SSP1 to SSP3 and service support system IP1 to IP3. Control programs run on such a hardware-platform perform the functions of a service control point. They very well fulfill the functions of a service logic for one or more services, that is to say, they control the results of these services. Moreover, they govern the voice announcement and speech/texts in use in these services. The exact method of functioning of the service control points SCP1 and SCP2 can, for example, be learned from the article, "Characteristics of Intelligent Networks", Electrical Communications, Vol. 63, No. 4, 1989, pp. 314 to 320, written by L. Alvarez Mazo, et al.

It is possible that the service system SS accepts another number of service control devices.

In order to claim an offered service in the communications network KN1 service the subscriber A, by means of his terminal equipment TE, selects the service identification for the given service. A connection option with this service identification as call-up number is sent through the communications network KN1 and, for example, is recognized by the service switching point SSP1 as a service demand. The service switching point SSP1 then subsequently sends by means of the communication network KN2 a message to that particular service control facility, which is responsible for bringing about that service specified in the connection option.

The service demand from the subscriber A can also be effected in a different way. For instance the connection option of the subscriber, on the basis of his subscriber identification may be automatically sent to a service switching point and from thence, again automatically, triggered to a specific service.

Further, it is possible that the connection option from a service switching point, which has no service support system, can be forwarded to a service switching point which does have a service support system. A service access facility thus arises from these service switching points in combination with the service support system.

In this service control facility, e.g., the service control facility SCP1, the service logic assigned to this service is activated upon receipt of this message. In addition, the service control facility SCP1 loads all voice announcements and speech texts assigned to this service into the service support system IP1 where they are stored, i.e., all voice announcements and speech texts, which the service could access during its execution.

Now, if during the recovery of the service's voice announcements or speech texts, it becomes necessary to make a sending to the subscriber A, then the service switching point or facility sends by means of the communications network KN2, an appropriate demand message to the service support system IP1. On this demand message, the service support system sends the appropriate voice announcement or the corresponding speech text over the communications network KN1 to the end terminal TE. If the recovery of the service is ended, then a corresponding message is sent to the service support system IP1 by means of the service supply system SCP1, whereupon this erases the loaded voice announcement or speech text from its memory.

Figure 2:
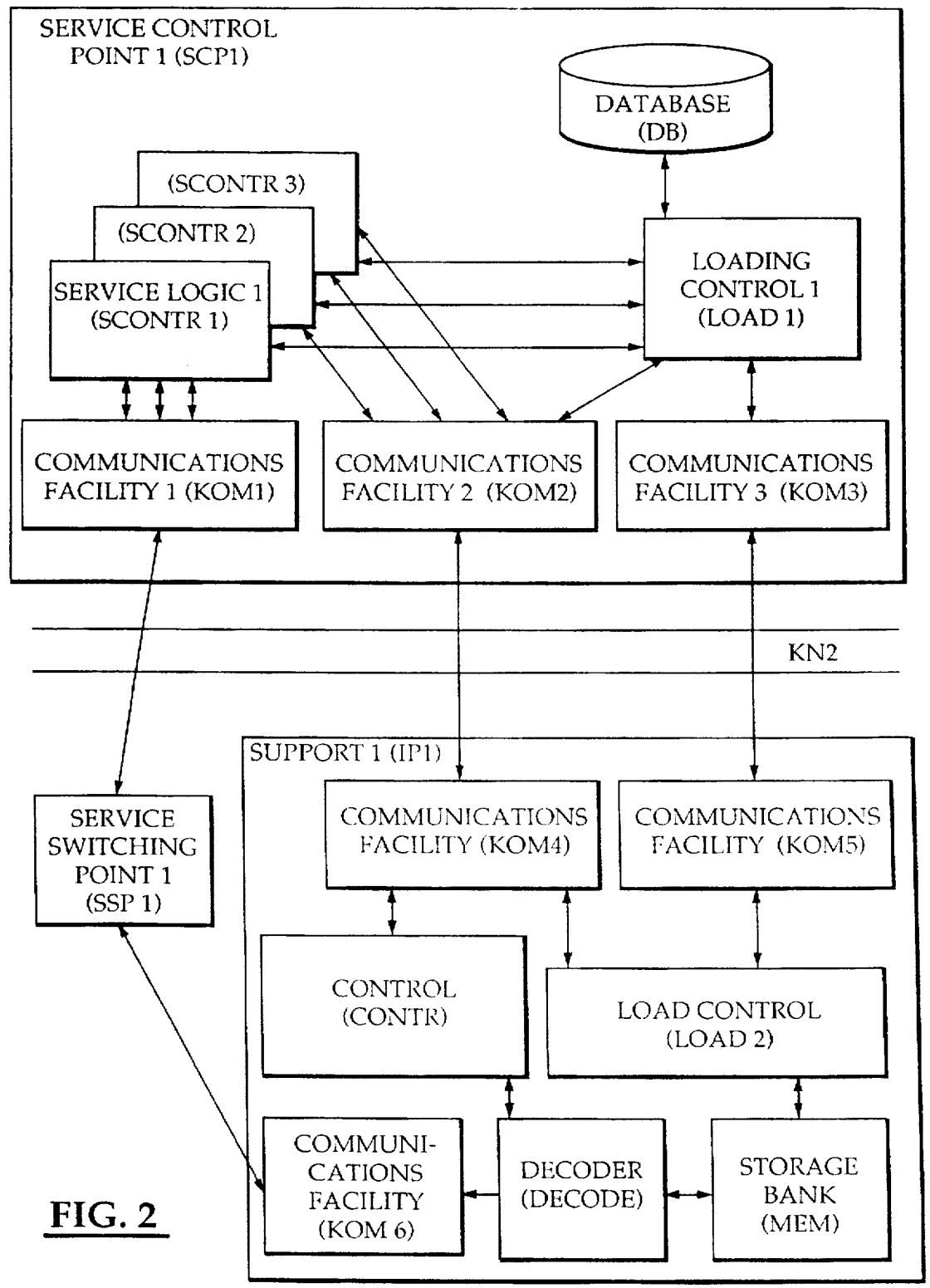
FIG. 2 shows a detailed block diagram of a section of the service system according to FIG. 1, in accord with the invention.

In the following, making speech announcements available is more closely described with the aid of FIG. 2:

FIG. 2 shows a section from the service system SS with the service control point or facility SCP1, with the service support system IP1, and the service switching point or facility SSP1. The service control facility SCP1 exchanges data with the service switching point SSP1 as well as the service support system IP1 by means of the communication network KN2. The service switching point SSP1 and the service support system IP1 exchange data between each other as well.

The service control facility SCP1 includes a database DB, a loading control LOAD1, three communication facilities KOM1 to KOM3 and three service logics SCONTR1 to SCONTR3.

The load control LOAD1 exchanges data with the database DB, with the service logics SCONTR1 to SCONTR3 and with the communications facilities KOM2 and KOM3. The service logics SCONTR1 to SCONTR3 exchange data at times with the communication facilities KOM1 and KOM2. The communication facility KOM1 exchanges data with the service switching point SSP1 and the service logics SCONTR1 to SCONTR3. The communication facilities KOM2 and KOM3 exchange data with the service support system IP1.

The communications facilities KOM1 and KOM2 provide the necessary communications service for the exchange of messages with the service switching point SSP1—as well as the service support system IP1. This communication is based on a signalling network in accord with the Protocol No. 7 of the CCITT on which the INAP (Intelligent Network Application Protocol) is set up. The mechanisms employed for this purpose can be learned from the above mentioned articles.

The possibility also exists to use this communication for other protocols for data networks, for instance the X.25 Protocol. In this instance, it should be noted, only one small bandwidth is required.

The communication facility KOM3 allows the required communication service for the transfer of data to the service support system IP1. When this is done, the transfer is effected by means of a transfer network based on ATM, and which allows the transfer of large quantities of data in a short time.

It is also possible to use other transfer networks with similar characteristics, i.e., for instance, for networks used for computer-to-computer communication network per the DQDB (Distributed Queue Dual Bus) or Token method, or a Router network. Even the employment of narrow band networks, for example of an ISDN Network (ISDN= Integrated Services Digital Network) or a net in accord with the X.25 Protocol is possible.

The service logic SCONTR1 to SCONTR3 always make available the necessary functions for the carrying through of a service. The number of available services from the service control facility SCP1 and thereby also the number of the service logics is, for instance, optional. Also, the service logic SCONTR1 is responsible for a service "Unified call-up number", the service logic SCONTR2 is responsible for a service "Virtual Private Network", and the service logic SCONTR3 is responsible for a service "Kiosk Service". The necessary functions and the necessary means for making these functions available can, for example, be taken from the above mentioned article, "Characteristics of Intelligent Networks".

Moreover there are further functions integrated into the service logics SCONTR1 to SCONTR3. They exchange messages with the load control LOAD1, by means of which, they (the service logics) inform the load control LOAD1 when their respective services are activated or deactivated and by means of which they are informed by the load control LOAD1, whether or not the spoken announcements and speech texts assigned to the services are available.

In the case of the database DB, one or more bulk storages are involved, for instance, hard disk drives. In the database DB all spoken announcement and speech texts are coded in digital form and stored, which are used by the available services of the service logic of SCONTR1 to SCONTR3.

In this, it is also possible that the database DB is not a component of the service control facility SCP1. The database DB can even be a component of a separate data bank which is subject to retrieval by means of the INAP-protocol or a data network, for instance a LAN (Local Area Network). Such a databank can be available for retrieval from several service control facilities, as though it were a central data bank.

It is advantageous to store the control programs corresponding to the service logics SCONTR1 to SCONTR3 together with the voice announcements and speech texts used in the services in the database DB according to a data structure, which data structure assigns the voice announcements and speech texts used by a service to the control programs, the execution of which corresponds to the control logic of the service. In doing this, it is possible that the user of a service has simultaneous access to the running of his service and to the employed voice announcements and speech texts of the said service.

If the services made available from the service logics SCONTR1 to SCONTR3 are services of one and the same network operator, it is additionally advantageous, that the database DB is a component of the service control facility SCP1. In this way, the running of a service as well as the employed voice announcements and speech texts are under the influence of the operator.

The load control LOAD1 governs the voice announcements and speech texts employed by the services of the service control facility SCP1. It further assures that the voice arrangements and speech texts needed by a service are available. The service referred to will be subject to the service control facility SCP1 and is in turn linked among those of the service support system IP1 to IP3. These latter are assigned to that service switching point, which activates said service.

If the loading control LOAD1 receives from one of the service logics SCONTR1 to SCONTR3 a message which indicates the activation of this service logic by means of a service switching point, then it defines the voice announcements and speech texts assigned to this service logic, reads them out of the database DB and sends this data record by means of the communication facility KOM3 to the service support system IP1 which is assigned to the activating service switching point, here, the service support system IP1. Parallel to this, it sends by means of the communication facility KOM2 control messages to this service support system, which indicate to said system, that preparations for the receipt and the storage of voice announcements and speech texts are to be made.

It is also possible that the data record, together with the control messages are transmitted by a common protocol.

If the loading control LOAD1 receives from one of the service logics a message, which indicates the deactivation of this service logic, then it sends by means of the communications facility KOM2, control messages to the service support system IP1, which alerts this facility to erase from the memory storage the voice announcements and speech texts which are assigned to this service logic and thereby the service support system IP1 is freed to accept other services.

It is also possible that the load control LOAD1 is equipped with functions whose goal is a minimizing of the data transfers between the service control facility SCP1 and the service support system IP1.

By way of example, the general deletion of the data records containing the voice announcements and speech texts of a service by deactivation of the service can be dispensed with. The load control LOAD1 would tag a list, as to which data record for which service in which service support system is already stored. Should a service be activated, then so would a check be made through this list as to whether or not the corresponding related data record is already stored in the service support system, to which the activating service switching point is assigned. Only when this is not the case, would the data record be input again into this service support system.

The use of such a list is again advantageous if the parallel furnishing of services for several subscribers by means of the service switching point SSP1 and the service support system IP1 is possible.

If the load control LOAD1 should receive a message over the communications facility KOM2 from the service support system IP1, to the end that no storage place is prepared for the storage of a further data record, then the load control LOAD 1 selects one of the stored data records in the service support system IP1, and by means of the sending of a control message to the service support system brings about the deletion of the said records. Criteria for selection of a record to be deleted can be that record which already has been stored the longest time in the service support system IP1, or the assigned service of which is least often activated, or that record which contains the least data.

It is also possible the choice of the data record to be deleted is taken over by the service support system IP1.

The service support system IP1 contains three communications facilities, KOM4 to KOM6, a control CONTR, a load control LOAD2, a storage bank MEM and a decoder DECODE. The loading control LOAD2 exchanges data with the communications facility KOM4 and KOM5 and with the storage facility MEM. The control facility CONTR exchanges data with the communications facility KOM4 and the decoder DECODE. The decoder DECODE reads data from the storage facility MEM and sends data to the communications facility KOM6. The communications facility KOM4 and KOM5 exchange data with the communications facility KOM2 and KOM3 of SCP1.

The communications facilities KOM4 and KOM5 are of similar configuration design to the communications facilities KOM2 or KOM3.

The communication facility KOM6 makes available a connection with the service switching point SSP1 by means of at least one hard wired channel and at least one signalling channel. Voice announcements or speech texts can be sent over these channels to subscribers of the communication network KN1.

The storage facility MEM concerns the immediate access memory or the mass storage memory computer system forming the service support system IP1.

The decoder DECODE produces from speech text stored in the memory facility MEM in decoded digital form a corresponding speech-signal and sends this speech-signal by means of the communications facility KOM6 to the service switching point SSP1. Again in this manner, it proceeds with a stored announcement text which it sends to the service switching point SSP1 over an ISDN signalling channel (ISDN=Integrated Services Digital Network) in the necessary data format appropriate thereto.

The control CONTR is responsible for the control of the service support system IP1. In this role it especially receives demand messages from the service control facility SCP1, which advises it to send specific voice announcements or speech texts by means of the service switching point SSP1 to a subscriber of the communication network KN1. It causes the decoding facility DECODE, to read out, decode and send this voice announcement or speech texts to the service switching point SSP1.

Details for the design and configuration of the above components of the service support system IP1 can be taken from the article mentioned above, "Voice services on the intelligent network: intelligent peripherals and service nodes".

The load control LOAD2 works together with the load control LOAD1 and completes the already described loading functions to be fulfilled from the side of the service support system IP1. These functions are especially the storage of received data records from the communication facility KOM5 in the memory facility as well as the management and the deletion of the data records from the memory bank MEM.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of providing messages to subscribers relating to services of a communications network (KN1) wherein a message is sent from a service support system (IP1, . . . , IP3) to a subscriber (A) of the communications network (KN1) in response to a request message from a service control point (SCP1, SCP2), characterized in that the messages are managed centrally by the service control point (SCP1, SCP2), and that the messages are loaded from the service control point (SCP1, SCP2) into the service support system (IP1 to IP3) on demand.

2. A method as claimed in claim 1, characterized in that the messages are stored centrally in a data base (DB) of the service control point (SCP1, SCP2).

3. A method as claimed in claim 1, characterized in that each of the services is controlled by a service logic (SCONTR1 to SCONTR3) of the service control point (SCP1), and that respective messages relating to services are assigned to the associated service logic (SCONTR1 to SCONTR3).

4. A method as claimed in claim 1, characterized in that, when the subscriber (A) activates a service via a service switching point (SSP1), there is a demand and all messages relating to the service are loaded into a service support system (IP1) associated with the service switching point (SSP1).

5. A method as claimed in claim 1, characterized in that, when a subscriber (A) activates a service via a service switching point (SSP1), a check is made to determine whether messages relating to the service are already stored in a service support system (IP1) associated with a service switching point (SSP1), and that if that is not the case, there is a demand and said messages are loaded into said service support system (IP1).

6. A process in accord with claim 1, characterized in that messages directed to a subscriber service are loaded by means of a broad band network from the service control point (SCP1, SCP2) into the service support system (IP1, . . . , IP3).

7. A service control point (SCP1) comprising a communications facility (KOM2+KOM3) for communicating with at least one service access facility (SA1) containing a service support system (IP1), and further comprising at least one service logic (SCONTR1 to SCONTR3) which is designed to send request messages requesting the sending of messages to subscribers relating to services, characterized in that the service control point (SCP1) is provided with a load device (LOAD1) which is responsive to said request messages from the service logic for managing the services messages centrally and for loading said services messages into the service support system (IP1, . . . , IP3).

8. A service support system (IP1) comprising a communications facility (KOM4+KOM5) for communicating with at least one service control point (SCP1), a memory device (MEM) for storing messages relating to services, and a controller (CONTR) which causes such a message to be sent to a subscriber (A) in response to a request message from the service control point (SCP1), characterized in that the service support system (IP1) is provided with a load device (LOAD2) which is designed to store messages relating to services which are received from the service control point (SCP1) in the memory device (MEM).

9. A service access facility (SA1 to SA3) comprising one or more service switching points (SSP1 to SSP3) and at least one service support system (IP1, . . . , IP3) which is connected to at least one of the service switching points (SSP1, SSP3), characterized in that the service support system (e.g., IP1) comprises a communications facility (KOM4+KOM5) for communicating with at least one service control point (SCP1), a memory device (MEM) for storing messages relating to services, and a controller (CONTR) which causes such a message to be sent to a subscriber (A) in response to a request message from the service control point (SCP1), and that the service support system (IP1) is provided with a load device (LOAD1) which is designed to store messages relating to services which are received from the service control point (SCP1) in the memory device (MEM).

10. A service switching point, characterized by a connection to a service support system (IP1) comprising a communications facility (KOM4+KOM5) for communicating with at least one service control point (SCP1), a memory device (MEM) for storing messages relating to services, and a controller (CONTR) which causes such a message to be sent to a subscriber (A) in response to a request message from the service control point (SCP1), and further characterized in that the service support system (IP1) is provided with a load device (LOAD2) which is designed to store messages relating to services which are received from the service control point (SCP1) in the memory device (MEM).

11. A service system (SS), comprising means for providing messages relating to services by providing messages to subscribers relating to services of a communications network (KN1) wherein said means includes a service support system (IP1, . . . , IP3) for said providing messages in response to a request message from a service control point (SCP1, SCP2) of said system, said system further comprising a service control point (SCP1, SCP2) for centrally managing the messages for loading from the service control point (SCP1, SCP2) into the service support system (IP1 to IP3) on demand.

* * * * *